Oct. 22, 1963 J. L. MURRAY 3,107,525
METHOD AND MEANS FOR MEASURING A JET ENGINE
THRUST BY SENSING THE OUTPUT NOISE
Filed Jan. 27, 1960 2 Sheets-Sheet 1
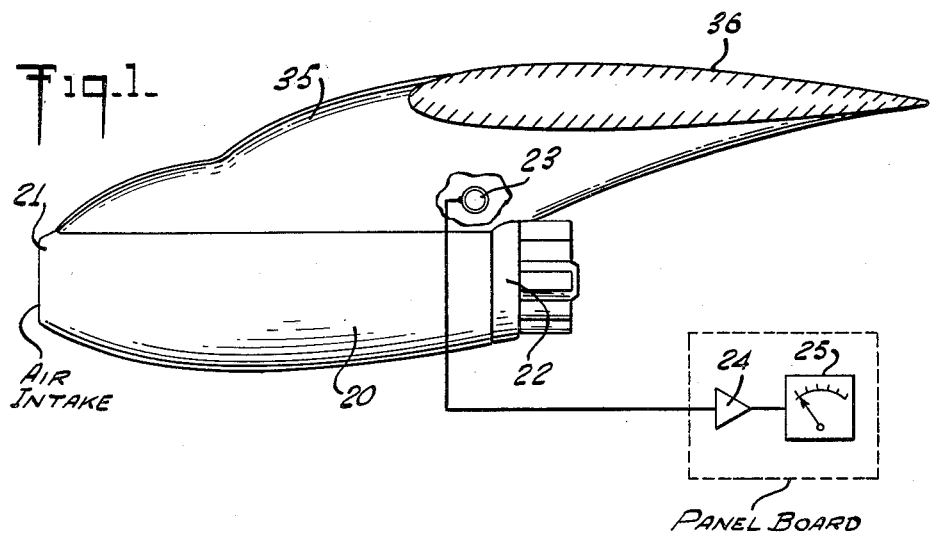
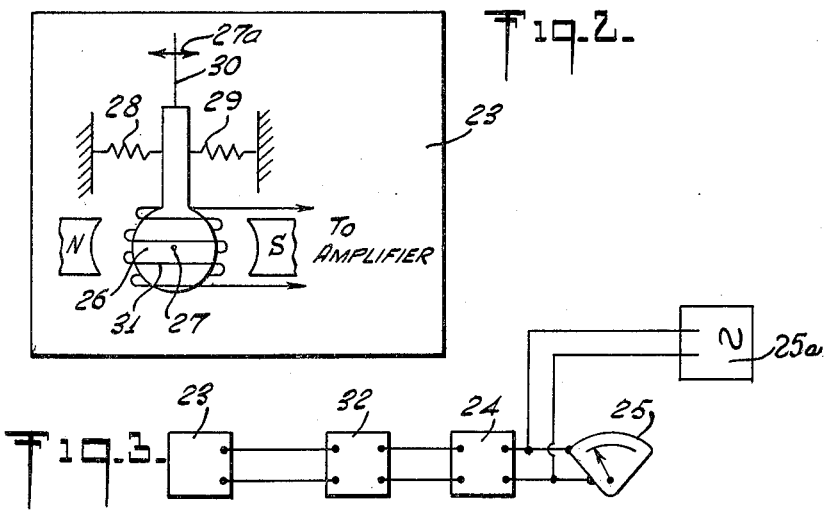
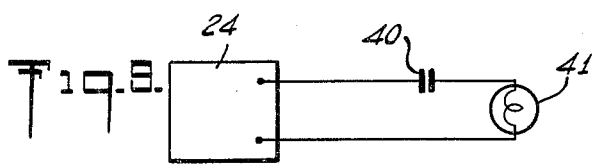
INVENTOR
JEROME L. MURRAY
BY
ATTORNEY

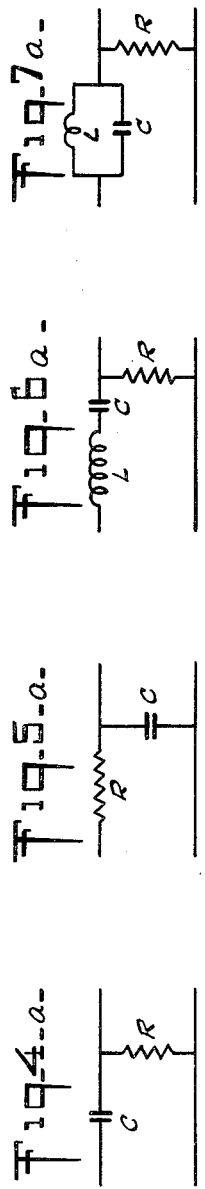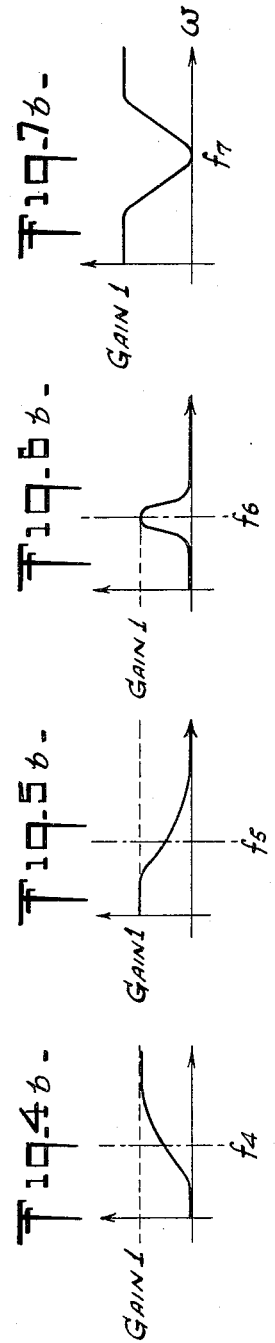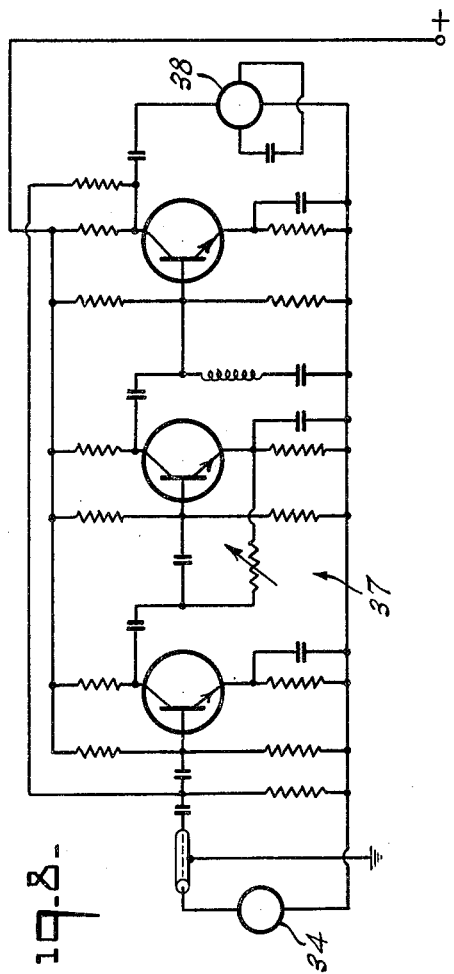

United States Patent Office 3,107,525
Patented Oct. 22, 1963

3,107,525
METHOD AND MEANS FOR MEASURING A JET ENGINE THRUST BY SENSING THE OUTPUT NOISE
Jerome L. Murray, 401 E. 58th St., New York 22, N.Y.
Filed Jan. 27, 1960, Ser. No. 4,993
5 Claims. (Cl. 73—116)

This invention relates to improved methods and means for measuring the thrust power of a jet power plant and, in particular, relates to improvements for measuring the output thrust power of aircraft jet power plants for the purpose of indicating take-off thrust for aircraft operation. The invention is also adaptable for analyzing jet engine operation to indicate whether the engine is operating properly or subject to a malfunction; the invention is also adaptable for gauging jet engine fuel combustion to aid efficient fuel consumption.

For the purpose of definition, the terms jet power plant and jet turbine engine mean a turboprop jet or turbojet particularly for aircraft use; the invention is applicable to either of these types of engines. In addition, the invention may be employed for the purposes set forth herein in other types of jet power plants, such as a ram-jet, a pulse-jet or rocket-like internal combustion engines.

The use of jet engines for aircraft has introduced new problems with respect to take-off of the aircraft which severely tax the pilot's skill, particularly, during the few critical seconds when the aircraft is accelerating along a runway for take-off. During this critical period of operation, the aircraft engines are taxed to deliver sufficient thrust to lift the craft into the air and, to date, no satisfactory means have been devised to indicate to the pilot whether or exactly when the engines are actually providing such take-off thrust. Generally, this critical information is ascertained from various kinds of intelligence fed to or obtained by the pilot, which intelligence when properly combined and synthesized is indicative of whether the engines are delivering take-off thrust. For example, as the aircraft moves along the runway, the pilot is fed various pressure readings from the engines and turbine r.p.m. The pilot combines this information with his own observations of distance markers along the runway and stop watch readings while the plane is accelerating. Since an interval of time will have lapsed between the measurement of the intelligence furnished the pilot and the actual position of the craft as it accelerates, the pilot must extrapolate these facts to estimate or conclude when take-off thrust is achieved. Consequently, the determination whether or when the aircraft engines are actually providing thrust take-off power depends solely upon the pilot's feel and experience to judge these matters. Unfortunately, these techniques are not entirely satisfactory for safety purposes and a more reliable and accurate method and apparatus is desired for such operation.

The instant invention operates on the discovered principle that output thrust sound emitted by a jet power plant incorporates sound frequencies, the intensities of which are a function of engine thrust power. Accordingly, it is the principle of the invention to sense the output sound produced by the individual jet engines during take-off operation and gauge the intensities of suitable frequencies of such output noise, that is to say, the noise intensities which vary in a known relationship to engine thrust power and indicate same on a voltmeter or other noise level indicator. One advantage of the invention is that it provides an accurate thrust power reading to the pilot contemporaneously with acceleration of the aircraft along the runway. Furthermore, this reading does not require any interpretation or extrapolation and may be easily read directly from an extremely simple and compact instrument on the pilot's panel board. Moreover, the invention may be carried out by extremely simple circuitry and does not impose any complex burden on aircraft instrumentation.

It is, therefore, the principle object of the invention to provide improved method and means for indicating directly the take-off thrust power of one or more jet power plants for aircraft operation, wherein the invention contemplates sensing the intensity of the output sound noise of each jet power plant and selectively amplifying the sound frequencies of such noise intensities which are proportional to or otherwise directly and lineally related to thrust power of the engines.

It is a further object of the invention to provide an aircraft instrument or gauging circuit extremely simple in fabrication and structure and reliable and accurate in operation comprising a sound sensor, an amplifier which may include suitable filter means for selectively amplifying sound frequency intensities sensed by the sensor and measuring means for the purpose of indicating the intensity of the selected sound frequencies, whereby the entire circuit is sufficiently small in size and weight to accommodate a single instrument unit on a pilot's panel board.

As a further object of the invention, the foregoing principle of operation may be adapted to analyze jet plant performance on the basis that the sound noise emitted by the output thrust of a jet engine will incorporate sound intensities of frequencies which are distinguishable and characteristic of engine operation and thus may be used to indicate whether the engine is operating properly or subject to a malfunction and type of malfunction. In the practice of this application of the invention, the indicator may take the form of an oscilloscope to depict sound intensity patterns characteristic of normal operation or a malfunction. Furthermore, certain types of malfunctions produce intermittent sound intensities, whereby the indicator may be in the form of a capacitive circuit which will provide a blinking signal in response to a derivative of the output thrust voltage produced by the gauging system.

It has also been discovered that sound intensities of characteristic frequencies are produced by the jet engine when fuel combustion occurs under proper burning conditions, which sound frequencies are distinguishable from sound intensity frequencies emitted by the engine when it is burning fuel under improper conditions. It is, therefore, a further object of the invention to sense this phenomenon to indicate whether or not fuel is being burned under optimum conditions so that the pilot may avoid inefficient fuel consumption operation during flight of an aircraft.

Further objects and advantages will become apparent from the following description of the invention taken in conjunction with the figures, in which:

FIG. 1 illustrates schematically a block diagram of a jet turbine engine gauging system in accordance with the invention;

FIG. 2 illustrates schematically a magnetic pickup device for sensing the thrust noise emitted by an engine in accordance with the invention;

FIG. 3 illustrates schematically a block diagram of the gauging circuit;

FIGS. 4(a) through 7(b) illustrate various filter networks and corresponding frequency curves therefor for selectively filtering engine noise responses for the practice of the invention;

FIG. 8 illustrates schematically a gauging system for indicating take-off thrust power of a jet engine in accordance with the invention; and FIG. 9 illustrates an alternative embodiment of an output indicator for the invention.

Reference is made to FIG. 1 which depicts a jet turbine engine 20. Engine 20 draws air through its intake 21 and exhausts through its tail cone pipe 22. The invention contemplates supporting sound pickup means 23 in or adjacent the exhaust tail cone 22, whereby pickup means 23 is adapted to sense the intensity of the sound frequencies created by the engine exhaust noise contemporaneously with engine operation. The sound of the thrust noise actuating pickup 23 is converted into a corresponding electrical signal, which signal is related to the engine thrust power. This electrical signal is fed to amplifier means 24. The output of amplifier 24 is fed to a noise level indicator 25, such as a voltmeter which is calibrated to indicate the exhaust sound intensity or thrust power of the engine. If amplifier 24 is transistorized, the combination of the transistor amplifier and voltmeter movement may be enclosed in a single casing which will be sufficiently small in size and weight for mounting on the pilot's panel board, whereby take-off engine power may be observed by the aircraft personnel contemporaneous with operation of the engine during runway movement of the craft. It will be understood that each engine will be individually gauged by its own pickup, amplifier and indicator apparatus. On the other hand, the gauging circuits of all the engines for a particular craft may be combined by use of individual pickups for each engine feeding a multi-channel amplifier, whereby the respective gauging signals for each engine are fed to a single indicator unit which includes a scale for each engine signal and a totalizing scale to show aggregate thrust power. The latter circuit arrangement may be carried by known conventional techniques. The power needed to operate a transistor amplifier is very small so that a very simple power supply is required for the circuit. The aircraft low voltage D.C. source may be used without excessive drain.

FIG. 2 depicts a simple magnetic pickup which may be employed as the sound sensor 23. A magnetic material rotor 26 is characterized by a predetermined mass of M and is adapted to rock about its horizontal shaft axis 27. Movement of rotor 26 is restrained by a pair of oppositely acting springs 28, 29 each characterized by a predetermined spring constant K. Rotor 26 is attached to a sound vibrating member depicted by 30, such as a tuning fork or a diaphragm of a microphone, whereby sound member 30 undergoes vibrations in accordance with the intensity and frequency of the engine exhaust sound. As sound member 30 vibrates, it will cause rotor 26 to rock about axis 27 as depicted by arrow 27a, whereby a coil 31 carried by rotor 26 is caused to oscillate in the magnetic field between pole pieces N—S. This action induces an electrical signal in coil 31 which is a function of the output sound intensity of the engine. The voltage generated in coil 31 is fed to amplifier 24. If pickup device 23 is supported inside the exhaust tail cone 22, the components constituting the pickup should be made of high temperature materials to withstand the surrounding heat.

In the practice of the invention, the noise produced by the engine exhaust may include a wide range of sound frequencies. The range of sound frequencies produced by engine exhaust will depend upon the particular engine, and may involve a response whereby certain of its sound frequencies will increase in intensity as its thrust power increases while other of its sound frequencies decrease in intensity as its thrust power increases. Furthermore, some of the sound frequencies of the engine exhaust noise will vary in intensity lineally with change of its thrust power while other sound frequency intensities will vary irregularly. The foregoing characteristics of any particular type of engine may be predetermined by ground and flight tests. Accordingly, once the frequency characteristics of a particular engine is ascertained by suitable pretests, it may be desirable to discriminate against certain sound frequencies and to pick up other sound frequencies of the thrust noise for operation of the invention.

Two techniques may be employed to obtain workable sound frequencies for gauging an engine and these techniques may be used singly or in combination. The first involves the use of a pickup 23 of known frequency characteristics or regulating the mechanical characteristics of the pickup. For example, with respect to the illustrated magnetic pickup, its frequency characteristics may be regulated by suitably preselecting rotor mass M, spring constant K and/or regulating the friction of rotor 26 for turning about its shaft axis 27. The second technique involves the use of filter means in any suitable manner in the circuit. Filter means are depicted as 32 in FIG. 3, for example between pickup 23 and amplifier 24.

FIGS. 4a through 7a depict four filters that may be used in conjunction with the foregoing system. FIG. 4a is a high-pass filter and its frequency characteristic is shown in FIG. 4b. It blocks frequencies below $f_4$ and passes frequencies above $f_4$. FIG. 5a is a low-pass filter with its frequency characteristic shown in FIG. 5b. Its response is the opposite of the high-pass filter of FIG. 4a. FIG. 6a is a band-pass filter and its frequency characteristic is shown in FIG. 6b. It passes a band of frequencies near $f_6$ and blocks the higher and lower frequencies. FIG. 7a is a band-eliminating filter with its frequency characteristic as shown in FIG. 7b. Its response is the opposite of the band-pass filter of FIG. 6a.

By using the foregoing described techniques, the take-off power of a jet turbine engine may be accurately gauged by measuring a particular frequency range of its exhaust sound, whereby the output of the foregoing gauging circuit, that is to say, the reading of voltmeter 25 is directly related to engine thrust power. As long as there is a predetermined correspondence between the voltage signal supplied to voltmeter 25 and the engine thrust power, the indicator can be calibrated to register engine thrust on a one-to-one basis.

FIG. 8 illustrates a circuit for gauging thrust power and is designed specifically to indicate "go-no go" take-off thrust power to the pilot of a commercial jet aircraft employing four 21 nozzle inflight suppressor JP3 Pratt & Whitney engines. In accordance with the FIG. 8 embodiment of the invention, the sound noises of each engine is sensed by an individual pickup 34, a conventional microphone, supported in the interior of the aircraft pylon structure 35 from which the engine 20 is suspended as depicted in FIG. 1. It will be understood that pylon 35 depends from the aircraft wing 36. The position of pickup 34 in pylon 35 is slightly to the rear and above the opening of the engine thrust tail cone 22. In this embodiment, directional microphones were used to sense the noise of the individual engines to avoid the sound of any one engine interfering with gauging of the sound of the adjacent engine. The output signal from microphone 34 is amplified by the illustrated capacitive coupled three stage transistor amplifier 37 which includes in the output of its second stage an L—C filtering circuit, whereby the output signal frequency fed to the indicator voltmeter 38 corresponds to those thrust noise frequencies that are related to output thrust power of the JP3 engine. It will be understood that one advantage of the invention is that it permits the use of conventional amplifier circuitry for the purpose of gauging engine thrust. By means of pretesting the output thrust sound characteristics of the JP3 engine, it was ascertained that the intensity of its exhaust sound frequencies from about 1,000 to about 5,000 cycles vary in a direct lineal relationship with thrust power. Hence, the embodiment illustrated in FIG. 8 was selected to sense, amplify and indicate the intensities of these noises frequencies for the purpose of indicating thrust power. The individual indicators 38 are calibrated in pounds of thrust, whereby each indicator scale includes a marker at the value indicative of take-off thrust. As the indicator needle advances beyond the marker, the pilot at a quick glance is able to ascertain that the engine is providing take-off thrust power.

Since the foregoing gauging circuit may be employed to indicate engine thrust contemporaneously with engine operation, the circuit also may be used to indicate whether or not operation of a jet aircraft engine is normal or otherwise subject to a malfunction or danger of malfunction. Hence, the application of the invention may be extended to serve as an engine analyzer which is equally adaptable for pre-flight ground testing of jet aircraft engines or for analyzing such engines during actual flight. In the application of engine analysis, the output indicator may be a voltmeter as contemplated hereinbefore, an oscilloscope 25a, which will depict a thrust sound pattern, or a signal indicator as depicted in FIG. 9, or any combination of the foregoing.

For the purpose of engine analysis, it will be understood that the engine to be gauged or an engine of like type will be pre-tested to produce oscilloscope patterns or thrust power voltage signals that are indicative of normal engine operation over its rated or design range of output powers. These patterns or voltages will serve as the basis or standards against which patterns or voltage signals of malfunctioning engines are to be compared. Malfunction operation of the jet engine will produce oscilloscope patterns or thrust voltage signals distinguishable from the patterns that are indicative of proper engine operation. Moreover, such tests may readily establish a peculiar oscilloscopes pattern or thrust voltage signal which is indicative of a particular type of malfunction, and this information may be used to predict the type of malfunction whenever such pattern appears upon gauging and analyzing an engine. Since the use of an oscilloscope meter increases the complexity of the gauging circuit in comparison to the apparatus illustrated hereinbefore, engine analysis by an oscilloscope may be confined to pre-flight ground tests if circuit simplicity becomes a prime requirement. As seen from the foregoing remarks, it will be understood that the invention may be used for analysis during pre-flight testing of aircraft jet engines during take-off or during actual flight operation.

Certain kinds of engine malfunctions will create a continuous sound noise and thus a steady thrust pattern or output voltage thrust signal. A jet engine failure caused by turbine blade fatigue wherein the turbine blade elongates and scrapes the turbine cell structure during operation is one example of this type of malfunction. Rotor blade scraping causes a continuous and definite high frequency noise peculiar to this type of trouble. The noise may be gauged by the foregoing invention by ascertaining the specific frequencies generated by rotor blade scraping, that is to say, the frequency range of the sound which is characteristic of such a malfunction. When this frequency is known for a particular type of jet engine, the amplifier of the gauging circuit may be tuned for amplifying such frequencies and if rotor blade malfunction is occurring, the indicator will show a voltage output. On the other hand, if the engine is free of the malfunction, the indicator will not report an output signal.

Other types of engine malfunctions are characterized by abrupt, sudden or discontinuous thrust sound noises to produce discontinuous sound patterns or thrust voltage signals. Fires, misfires or explosions in the jet power plant are examples of such malfunctions. When they occur, there is a sudden or abrupt change of thrust noise in contrast to the relatively constant output noise of a properly operating jet engine. The capacitor-bulb indicator of FIG. 9 is adapted to report phenomena causing sudden changes in output thrust sound, which indicator may be used in lieu of or in combination with the voltmeter or oscilloscope instrument. In FIG. 9, a capacitor 40 is connected in series with a low resistance bulb 41 and the combination is connected to the output of amplifier 24. The amplifier output is assumed to be D.C. voltage. If the output is A.C., it can be rectified to D.C. Since bulb 41 has low resistance, the voltage across capacitor 40 is essentially the output voltage of amplifier 24. When the output of the amplifier is relatively constant, the current through capacitor 40 is small or practically zero and bulb 41 will not light up. However, when there is a sudden change in the output of the amplifier, the current in the capacitor becomes very large since the current in the capacitor is proportional to the derivative of the voltage across it, whereby bulb 41 will light up indicating the engine malfunction. Bulb 41 may be mounted on the instrument panel. If the discontinuous malfunction is repetitive, the aircraft crew will see a blinking light.

In addition to the foregoing applications, the instant invention is also applicable to indicate whether the jet power plant is burning fuel efficiently on a blue flame or whether fuel is being burned on a yellow flame. The latter results in relatively inefficient fuel consumption which is obviously unsatisfactory for aircraft operation. When fuel is being consumed on a blue flame, the output thrust sound emitted by the engine includes noise frequency intensities which are characteristic of such burning and which noise frequency intensities are distinguishable from the noise frequency emitted when fuel is being consumed on a yellow flame. By pretesting a jet engine for fuel consumption on a blue flame, the noise frequency intensities characteristic of such fuel consumption may be ascertained. During flight operation, the pilot may at any time tune the amplifier of the gauging circuit to such range of frequencies whereby an output voltage signal will be indicated if proper burning of fuel is occurring, otherwise, the pilot may take corrective measures to obtain improved fuel consumption. It will be understood that the amplifier circuit for the gauging system is suitably tunable for the application of the invention to indicate efficient fuel consumption as well as malfunctions which may be indicated by individually distinguishable sound intensity frequencies characteristic of such malfunctions.

It is intended that all matter contained in the above description or shown in the accompanying drawings shall be interpreted as illustrative and not in a limiting sense.

What is claimed is:

1. A method for ascertaining the output thrust power of a jet turbine engine comprising the steps of, sensing the output sound noise of the thrust power output of said engine, converting such sound noise to a corresponding electrical voltage signal, filtering such signal to obtain an output signal characterized by frequencies of such noise wherein said output signal varies in intensity in a predetermined relationship with respect to output thrust power of said engine, and measuring the intensity and change of intensity of said output signal.

2. A method as defined in claim 1 wherein, said measuring step includes feeding said output signal to a capacitive circuit adapted to indicate abrupt changes of said output voltage signal in accordance with its derivative.

3. A method for ascertaining the output thrust power of a jet turbine engine for propelling an aircraft comprising the steps of, sensing the sound frequencies of the output thrust power noise of said engine during aircraft take-off, converting such sound noise to a corresponding electrical voltage signal, amplifying said voltage signal, filtering said signal to obtain an output frequency signal characterized by an intensity varying in known relationship with respect to output thrust power of said engine, and measuring the intensity and change of intensity of said output signal.

4. Apparatus for measuring the thrust power of a jet turbine engine comprising; sound sensor means supported adjacent the output tail cone of said engine for sensing the sound frequencies of the engine output thrust sound; means for converting said sound frequencies into a corresponding electrical voltage signal; means for filtering said signal to produce a voltage output signal of frequencies wherein the intensity of said output voltage signal varies in predetermined relationship to output engine thrust power; and means for indicating the intensity and change of intensity of said output voltage signal; wherein said indicating means including a capacitive circuit comprises, capacitor means in series with low resistance current conductive means, said output voltage signal being connected across said capacitive circuit whereby abrupt changes of said output thrust power causes current flow through said conductive means as a function of the derivative of the voltage across said capacitor means.

5. Apparatus for ascertaining the take-off thrust power of a jet turbine engine for propelling an aircraft comprising; sound sensor means supported adjacent the output tail cone of said engine for sensing sound frequencies of the engine output thrust power during aircraft take-off operation; means for converting said sound frequencies into a corresponding electrical voltage signal; means for amplifying said voltage signal; means for filtering said signal to produce a voltage output signal of frequencies wherein the intensity of said voltage output signal varies in predetermined relationship to the engine output thrust power; and means for indicating the intensity and change of intensity of said output voltage signal; wherein said engine is suspended by a pylon from the aircraft wing, said sensor means comprising, a frequency and directional selective microphone supported in the pylon from which said engine is suspended.

References Cited in the file of this patent

UNITED STATES PATENTS

| | | |
|---|---|---|
| 2,174,176 | Journeaux et al. | Sept. 26, 1939 |
| 2,340,714 | Traver et al. | Feb. 1, 1944 |
| 2,690,647 | Woodward | Oct. 5, 1954 |
| 2,730,896 | De Boisblanc | Jan. 17, 1956 |

OTHER REFERENCES

Greatrex, F. B., Engine Noise. In Journal of the Royal Aeronautical Society, vol. 58, Apr. 1954, pp. 223–235, TL 501 A35.

Publication: Gas Turbines for Aircraft, by A. W. Judge, Chapman & Hall Ltd., London (1958), page 343.